(No Model.) 2 Sheets—Sheet 1.
J. F. McLAUGHLIN.
MANUFACTURE OF ELECTRODES FOR SECONDARY BATTERIES.
No. 475,335. Patented May 24, 1892.
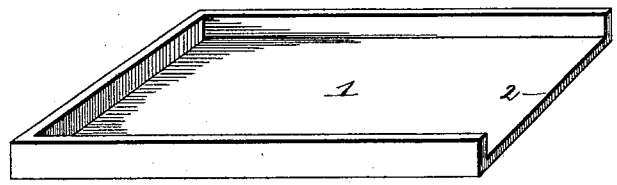
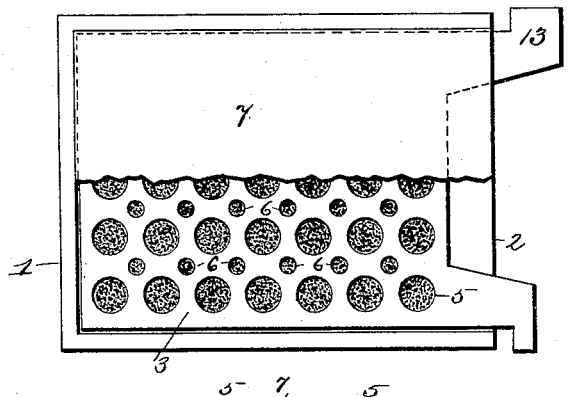
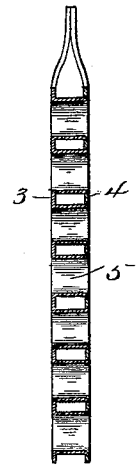
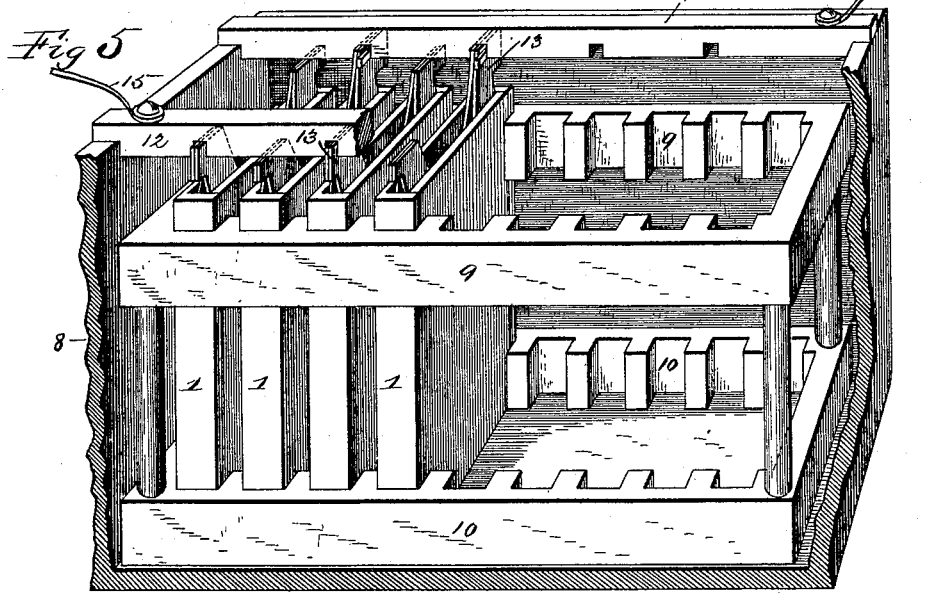
WITNESSES: Percy C. Bowen, F. J. Chapman
INVENTOR, James F. McLaughlin, By Joseph Lyons, Attorney (No Model.) 2 Sheets—Sheet 2.
J. F. McLAUGHLIN.
MANUFACTURE OF ELECTRODES FOR SECONDARY BATTERIES.
No. 475,335. Patented May 24, 1892.
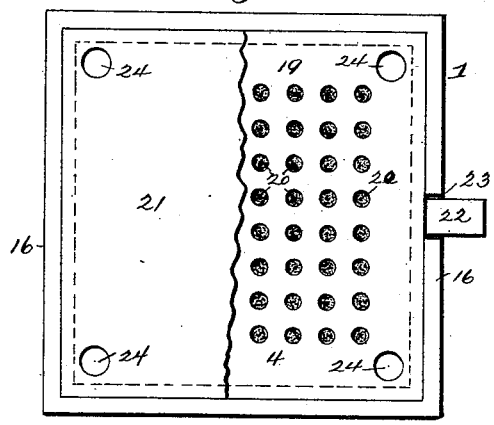
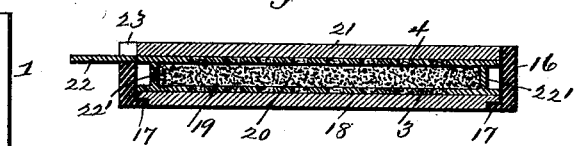
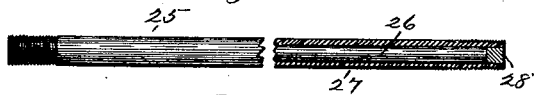
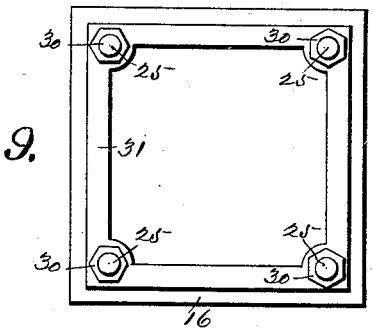
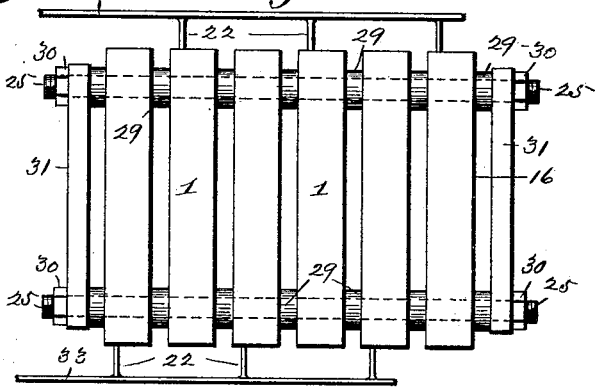
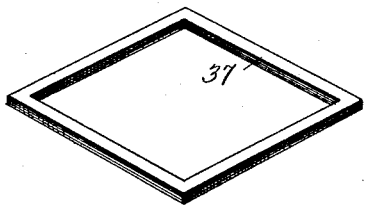
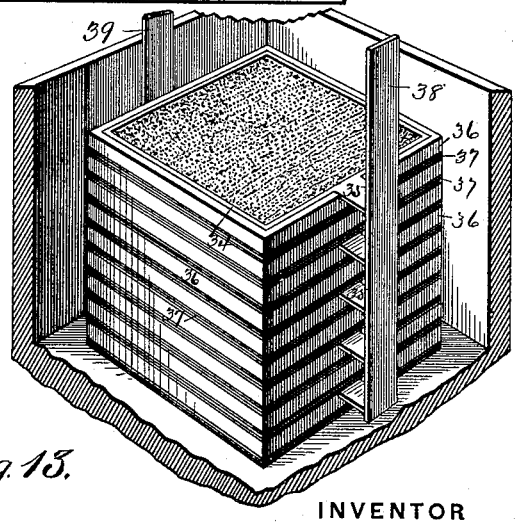
WITNESSES:
Percy C. Bowen
F. T. Chapman
INVENTOR
James F. McLaughlin,
By Joseph Lyons,
Attorney

UNITED STATES PATENT OFFICE.

JAMES F. McLAUGHLIN, OF PHILADELPHIA, PENNSYLVANIA.

MANUFACTURE OF ELECTRODES FOR SECONDARY BATTERIES.

SPECIFICATION forming part of Letters Patent No. 475,335, dated May 24, 1892.

Application filed January 31, 1890. Serial No. 338,728. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in the Manufacture of Electrodes for Secondary Batteries, of which the following is a specification.

This invention relates to the manufacture of electrodes for secondary batteries, and more specifically to the method of applying the active material to the electrode-supports and subsequently forming the electrode.

For this purpose my invention consists, essentially, in taking the electrode-supports and applying to them the dry active material—such as red oxide of lead—preferably mixed with plaster-of-paris, then inclosing the support with the applied active material with a casing, which, for the purpose of holding the powdered material in place and yet permitting it to be acted on by the acidulated water in the forming-bath, is of porous material—such as unglazed earthenware—then transferring a number of such assembed electrodes and casings containing the dry active material, which, for the sake of brevity, I will term "molds," to the forming bath or vat, connecting them in the usual way, and then passing repassing the current through them until when red oxide of lead has been used the dry active material of one set of the molds has been converted into a spongy mass of lead adhering to the electrode-support and that in the other set into a similar spongy mass of lead coated with peroxide of lead.

My invention also consists in the apparatus for carrying out this process and in other valuable features to be hereinafter described, and pointed out in the claims.

To enable others skilled in the art to which this invention relates to fully understand the same, I will now proceed to give a detailed description thereof, reference being had to the accompanying drawings, in which—

Figures 1 to 5 represent one form of apparatus for carrying out my process, Fig. 1 being an isometric view of a tray of porous material used in carrying out my process, Fig. 2 a sectional view of one form of electrode-support used, Figs. 3 and 4 a plan and vertical central section, respectively, of said support in position in the porous tray, and Fig. 5 an isometric view of the forming-vat, a number of electrode-supports being shown in position in the trays and the sides of the vat partly broken away to expose the interior. Figs. 6 to 10 represent another form of apparatus for carrying out my process, Figs. 6 and 7 being a plan and a vertical section, respectively, of an electrode-support contained in the tray and filled in with the active material, Fig. 8 a view of one of the connecting-rods for coupling a series of electrode supports and trays in the form of a pile, and Figs. 9 and 10 a plan and side view, respectively, of such a pile. Figs. 11 to 13 represent still another arrangement of apparatus, Fig. 11 being a vertical section of an electrode-support in the shape of a pan and inclosed in a tray of porous material; Fig. 12, an isometric view of an insulating-frame for spacing a number of such electrode-supports and trays when arranged in the shape of a pile, and Fig. 13 a similar view of a pile so disposed in a forming-vat.

Referring to Figs. 1 to 5, I will proceed to describe my process in connection with the apparatus there illustrated. I take a tray 1 of porous material—such as unglazed earthenware—and open at its edge 2, and place therein the electrode-support, (shown detached in Fig. 2,) and which consists, essentially, of two parallel plates 3 and 4, of lead, connected and held apart by tubes 5, preferably forming part of the one plate 3 and passing through perforations in the other plate 4, and being shouldered and spun onto the said plate 4 at the ends for the purpose of securely holding the same. In addition to this, the plates 3 4 have a number of perforations 6, which admit of the entrance of the active material between the plates and the exposure of such material to the electrolyte. The dry mixture of red oxide of lead and plaster-of-paris in a powdered state is then filled into the electrode-support until it fills out every space left by the perforations 6, tubes 5, and between the plates 3 and 4. Thereupon a cover 7, snugly fitting within the flanges of the pan 1, and also of porous material—such as unglazed earthenware—is placed upon the electrode-plate. The parts so assembled, and which for brevity I will term the "mold," present the appearance disclosed in Figs. 3 and 4. When a number of such molds have been formed, they are transferred to the forming jar or bath 8, (illustrated in Fig. 5,) where the molds are held upright and separated from each other by notched frames or racks 9 10 of insulating material and located at the top and bottom of the jar. The molds are preferably arranged in multiple arc—that is to say, the alternate molds are all connected by strips 11 12 of conducting material—such as lead—whose notches embrace the ears 13 of the electrode-supports 3 4, which protrude from the pans of earthenware. These conducting-strips 11 12 are located on opposite sides of the jar, and the ears 13 of the electrode-plates are of different heights, as usual, a long ear alternating with a short ear on each side, so as to enable the conducting-strips to clear the electrode-supports, which they are not designed to connect. The apparatus is completed by the leading-in wires 14 and 15, which connect the same with a source of electricity. The parts having now all been adjusted and the forming vat or jar being filled with dilute sulphuric acid, as usual, the current is passed and repassed through the apparatus to the required extent, the resultant article being the desired electrode, one set of electrodes containing a mass of spongy or honey-combed lead simply, while the other set contains such a spongy mass coated with peroxide of lead, the spongy mass in both cases strongly adhering to the electrode-support.

In Figs. 6 to 10 I have shown another arrangement of molds for carrying out my process. Here the tray for holding the dry active material is formed by a quadrangular frame 16 of insulating material—such as gutta-percha, hard rubber, or the like—and having bottom ledges 17 and a plate 18 of porous insulating material resting on the bottom ledges. A perforated electrode support or case 19, with the dry active powdered material 20 completely filled in, is placed in this tray, and finally another plate 21 of porous material is superimposed thereon, completing the inclosure of the electrode-support. A strip of lead 22, forming a part of the electrode-support, extends out from the mold through a notch 23 in the insulating-frame for the purpose of forming the connections in the forming-bath. The electrode support or case 19 in this instance consists of two lead plates 3 4, each having a series of perforations and disposed parallel to each other and held apart by feet 22', cast onto one of the plates and soldered to the other. The active material fills the whole space inclosed by the two plates, and access of the electrolyte to the same is permitted by the perforations in the plates. Holes 24, preferably four in number, extend entirely through the mold, and a number of these molds are assembled to form a pile and are firmly connected by the posts 25, which are passed through the holes. These posts, as shown in Fig. 8, are composed of steel rods 26, enveloped by sleeves 27 of insulating material—such as hard rubber—which sleeves are screw-threaded at their ends. These sleeves are closed by plugs 28 of hard rubber to prevent the access of the electrolyte to the steel rods. The purpose of the steel rods is to impart the necessary stiffness to the posts. To space the molds upon the insulated rods, washers 29 of the insulating material are interposed between them. The molds are held in place by nuts 30, bearing on the quadrangular frames 31, which in turn bear against the terminal washers of the pile. The molds are again connected and arranged in multiple arc by connecting the strips 22 of alternate molds with the lead strips 32 and 33, respectively. The pile so formed is then immersed in the forming-bath, when the action described in connection with my first arrangement takes place.

Still another, and, in my opinion, the preferable form of arrangement of my molds for producing secondary-battery electrodes, is illustrated in Figs. 11, 12, and 13. Under this arrangement I use as the electrode-support a simple pan 34 of lead, formed with a tongue 35 and perforated. This support is preferably quadrangular in shape, and I place it in a correspondingly-shaped tray 36 of porous insulating material and then thoroughly fill in the dry powdered mixture of red oxide of lead and plaster-of-paris. When a number of these molds have been completed, I superimpose them upon each other, separating them by frames 37 of insulating material. I then connect the tongues 35 of alternate molds with the lead strips or conductors 38 and 39, respectively, and transfer them to the forming bath or vat, as indicated in Fig. 13, and then the action referred to in connection with the other two arrangements already described takes place.

The electrode produced by the use of the apparatus last described has a clear surface of active material strongly adhering to the support after it has been subjected to the forming process, and by reason of the simplicity of the process and of the apparatus required for the same it offers great advantages.

Having now fully described my invention, I claim and desire to secure by Letters Patent—

1. The improvement in the art of making secondary-battery electrodes, which consists in packing against a suitable conductor-support in a non-conducting mold dry powdered active material and then solidifying and joining said material to its support by electrolytic action, substantially as described.

2. The improvement in the art of making secondary-battery electrodes, which consists in packing against a metallic support in a non-conducting mold dry powdered active material and then subjecting the same to the action of a current of electricity within an electrolytic bath, substantially as described.

3. The improvement in the art of making secondary-battery electrodes, which consists in placing a suitable electrode-support in a porous non-conducting mold and packing dry powdered active material against the support within the mold and then solidifying and joining said material to its support by electrolytic action, substantially as described.

4. The improvement in the art of making secondary-battery electrodes, which consists in placing a suitable electrode-support of lead in a porous non-conducting mold and packing a dry powdered mixture of oxide of lead and plaster-of-paris against the support within the mold and then subjecting the whole to the action of a forming-current within a bath of dilute sulphuric acid, substantially as described.

5. An apparatus for making secondary-battery electrodes, consisting, essentially, of a mold of porous non-conducting material for the reception of the electrode-support and the active material for the same, and an electrolytic bath for the reception of a number of said molds, and circuit connections as described, substantially as described.

6. An apparatus for making secondary-battery electrodes, consisting, essentially, of a mold of porous non-conducting material for the reception of the electrode-support and the active material for the same, an electrolytic bath adapted for the reception of a number of said molds, and means for spacing the latter within the bath, substantially as described.

In testimony whereof I have signed my name to this specification in the presence of two subscribing witnesses.

JAMES F. McLAUGHLIN.

Witnesses:
HERBERT P. KERR,
EDWIN F. GLENN.